(12) United States Patent
Jolda

(10) Patent No.: US 8,678,126 B1
(45) Date of Patent: Mar. 25, 2014

(54) MOTOR VEHICLE

(75) Inventor: Matthew Jolda, Sunnyvale, CA (US)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/617,400

(22) Filed: Sep. 14, 2012

(51) Int. Cl.
*B60R 22/48* (2006.01)
*B60R 22/10* (2006.01)

(52) U.S. Cl.
USPC ..... 180/268; 280/801.1; 297/468; 340/457.1; 701/45

(58) Field of Classification Search
USPC ............... 180/270, 268; 280/801.1; 297/468; 340/457.1, 457, 425.5; 701/45
See application file for complete search history.

(56) References Cited

U.S. PATENT DOCUMENTS

| 4,673,195 A | 6/1987 | Boyd et al. |
| 4,973,106 A | 11/1990 | Strovinskas |
| 5,394,955 A | 3/1995 | Howard |
| 6,260,650 B1 | 7/2001 | Gustavsson |
| 6,809,640 B1 * | 10/2004 | Sherman ................... 340/457.1 |
| 8,220,579 B2 * | 7/2012 | McCoy ......................... 180/268 |
| 2005/0200466 A1 * | 9/2005 | Amemiya .................. 340/457.1 |
| 2010/0114436 A1 * | 5/2010 | Bernhagen et al. ............. 701/45 |
| 2011/0012402 A1 * | 1/2011 | Inayoshi et al. ........... 297/217.2 |

FOREIGN PATENT DOCUMENTS

| DE | 26 12 396 | 9/1997 |
| DE | 10 2007 049 305 A1 | 4/2009 |
| WO | WO 99/07576 | 2/1999 |

* cited by examiner

*Primary Examiner* — Keith Frisby
(74) *Attorney, Agent, or Firm* — Muncy, Geissler, Olds & Lowe, P.C.

(57) ABSTRACT

A motor vehicle having a first vehicle seat, a first seat belt, assigned to the first vehicle seat and having an assigned first receptacle, at least one second vehicle seat, a second seat belt, assigned to the second vehicle seat and having an assigned second receptacle, a first receptacle sensor for determining whether the first seat belt is engaged in the first receptacle, a second receptacle sensor for determining whether the second seat belt is engaged in the second receptacle, and a man-machine interface for outputting a start command. In addition, the motor vehicle includes a control unit for generating the start command and for determining the time from the outputting of the start command to the engaging of the first seat belt in the first receptacle and the time from the outputting of the start command to the engaging of the second seat belt in the second receptacle.

24 Claims, 4 Drawing Sheets

MOTOR VEHICLE

BACKGROUND OF THE INVENTION

1. Field of the Invention

The invention relates to a motor vehicle having at least two vehicle seats, each of which is assigned a seat belt and a corresponding receptacle, whereby receptacle sensors are provided for determining whether a seat belt is engaged in a receptacle.

2. Description of the Background Art

DE 10 2007 049 305 A1 discloses a safety device for an occupant of a vehicle, which is equipped with a seat belt, a sensor device for detecting the attached condition of the seat belt, and an information playback device, which is operatively connected to the sensor device, whereby the information playback device can be switched from a maintenance operating mode to an "appeal" operating mode, when the sensor device detects that the seat belt is not or not properly attached.

U.S. Pat. No. 4,673,195 discloses a vehicle seat belt with a pair of safety belt parts for securing passengers, when the seat belt parts are coupled together. In this regard, a switch is provided, which is automatically brought into a de-energizing position when the seat belt parts are separated.

WO 99/07576 discloses a system which by means of an incentive device is intended to encourage users to fasten seat belts.

SUMMARY OF THE INVENTION

It is therefore an object of the invention to improve the acceptance of seat belts. It is a further object of the invention to increase the number of persons who are buckled up in a vehicle or a motor vehicle. In this regard, children in particular are to be encouraged to buckle up.

The aforementioned object is attained in an embodiment by a motor vehicle, which includes a first vehicle seat, a first seat belt, assigned to the first vehicle seat and having an assigned first receptacle, at least one second vehicle seat, a second seat belt, assigned to the second vehicle seat and having an assigned second receptacle, a first receptacle sensor for determining whether the first seat belt is engaged in the first receptacle, a second receptacle sensor for determining whether the second seat belt is engaged in the second receptacle, and a man-machine interface for outputting a start command. The motor vehicle can also include a control unit for generating the start command and for determining the time from the outputting of the start command to the engaging of the first seat belt in the first receptacle and the time from the outputting of the start command to the engaging of the second seat belt in the second receptacle.

A man-machine interface within an embodiment of the invention includes, for example, a display. A man-machine interface within an embodiment of the invention includes, for example, an infotainment display, as is designated, for example, with reference character 42 in FIG. 2. A man-machine interface can also be a display for back rows of seats in a motor vehicle. Further, a man-machine interface can also be, for example, a speaker or a lighting device.

In an embodiment, a start command can be output, for example, acoustically and/or visually. A start command can be, for example, the command "on your mark, get set, go" or "ready, steady, go" or a countdown, for instance, "5, 4, 3, 2, 1 . . . buckle."

A seat belt is configured to be engaged in a receptacle particularly when a respective passenger is properly secured or buckled in by the seat belt.

In an embodiment of the invention, the control unit is configured to compare the time from the outputting of the start command to the engaging of the first seat belt in the first receptacle with the time from the outputting of the start command to the engaging of the second seat belt in the second receptacle.

In another embodiment of the invention, the control unit can be configured to initiate the outputting (particularly by means of the man-machine interface or another man-machine interface) of the shorter time, i.e., to output (particularly by means of the man-machine interface or another man-machine interface) the shorter of the two times. In another embodiment of the invention, the control unit can be configured to initiate the outputting (particularly by means of the man-machine interface or another man-machine interface) of an identification of the vehicle seat corresponding to the shorter time. In another embodiment of the invention, the control unit an be configured to initiate the outputting (particularly by means of the man-machine interface or another man-machine interface) of an identification of the person occupying the vehicle seat corresponding to the shorter time.

In another embodiment of the invention, the motor vehicle can further include an Internet interface assigned to the control unit, particularly for posting on the Internet the person occupying the vehicle seat corresponding to the shorter time.

In another embodiment of the invention, the motor vehicle can include a camera for photographing a person, occupying the first vehicle seat, particularly during the time from the outputting of the start command to the engaging of the first seat belt in the first receptacle.

In another embodiment of the invention, the motor vehicle can include a camera arrangement for photographing a person occupying the first vehicle seat and a person occupying the second vehicle seat. A camera arrangement within an embodiment, can include one or more cameras. It can be provided that each vehicle seat or each participating vehicle seat is assigned a camera, suitable for photographing the buckling process and/or the passenger of the respective vehicle seat.

In another embodiment of the invention, the motor vehicle can include a camera arrangement for photographing a person, occupying the first vehicle seat, during the time from the outputting of the start command to the engaging of the first seat belt in the first receptacle, and a person, occupying the second vehicle seat, during the time from the outputting of the start command to the engaging of the second seat belt in the second receptacle. In another embodiment of the invention, the motor vehicle can further include an Internet interface, assigned to the control unit, for posting a photograph, taken by the camera arrangement, in regard to the person occupying the vehicle seat corresponding to the shorter time. In another embodiment of the invention, the control unit can be configured to initiate the outputting (particularly by means of the man-machine interface or another man-machine interface) of a photograph, taken by the camera arrangement, with respect to the person occupying the vehicle seat corresponding to the shorter time.

In another embodiment of the invention, the motor vehicle can include a lighting device for lighting the first receptacle during the time from the outputting of the start command to the engaging of the first seat belt in the first receptacle. The lighting occurs in particular in a blinking manner. In another embodiment of the invention, the motor vehicle can include a lighting device for lighting the first receptacle during the time from the outputting of the start command to the engaging of the first seat belt in the first receptacle with a light of a first color. The lighting can occur, for example, in a blinking manner. In another embodiment of the invention, the motor vehicle can include a lighting device for lighting the first receptacle during the outputting of the start command with a light of a second color. The lighting can occur, for example, in a blinking manner. It is also provided that the first and the second colors can be different. For example, the first color can be red or green, or the first and second color can be any combination of colors.

The motor vehicle can also include a lighting device for lighting the second receptacle during the time from the outputting of the start command to the engaging of the second seat belt in the second receptacle. The lighting can occur in a blinking manner. In another embodiment of the invention, the motor vehicle can include a lighting device for lighting the second receptacle during a time from the outputting of the start command to the engaging of the second seat belt in the second receptacle with a light of the first color. The lighting can also occur in a blinking manner. In another embodiment of the invention, the motor vehicle can include a lighting device for lighting the second receptacle during the outputting of the start command with a light of the first or second color. The lighting can occur in a blinking manner.

A motor vehicle according to an embodiment is a land vehicle that can be used individually in street traffic. It is noted that motor vehicles according to the invention are not limited to land vehicles with an internal combustion engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
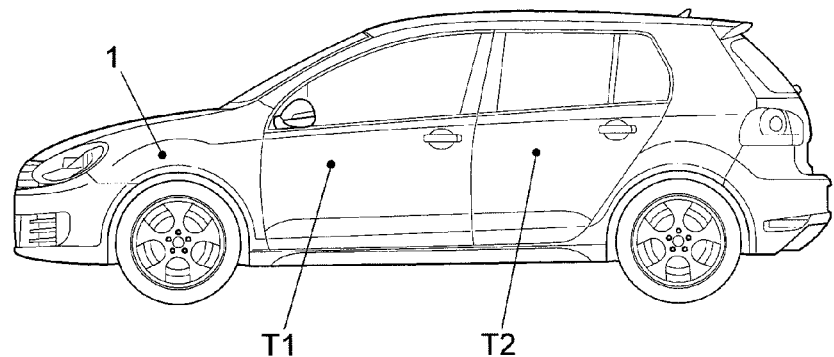
FIG. 1 shows an exemplary embodiment of a motor vehicle.
Figure 2:
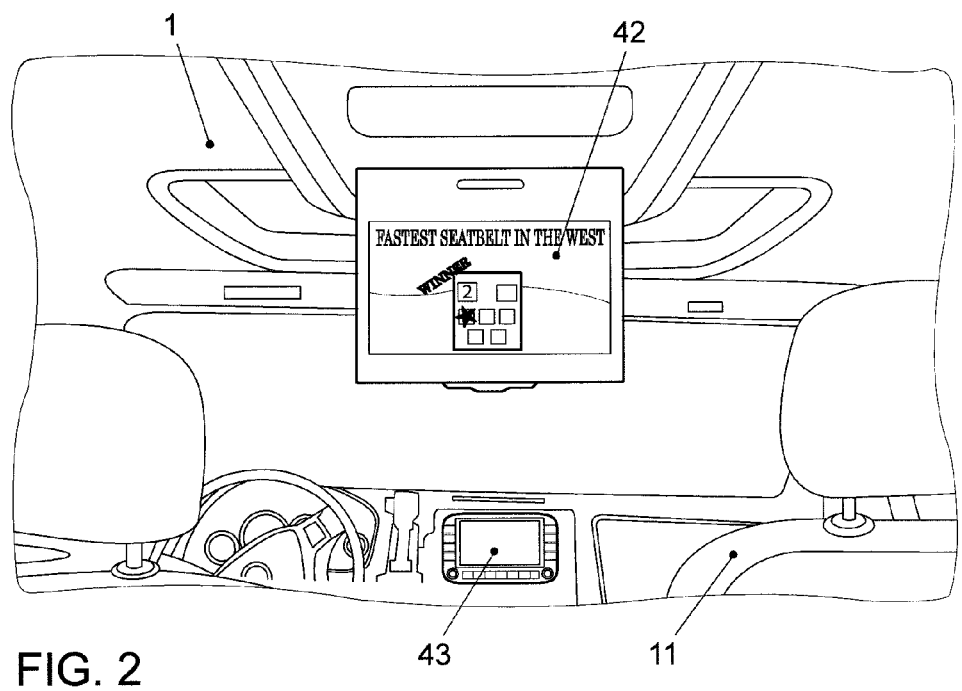
FIG. 2 shows the motor vehicle according to FIG. 1 in a partial interior view.

FIG. 1 shows an exemplary embodiment for a motor vehicle 1, which is shown in a partial interior view in FIG. 2.

Figure 3:
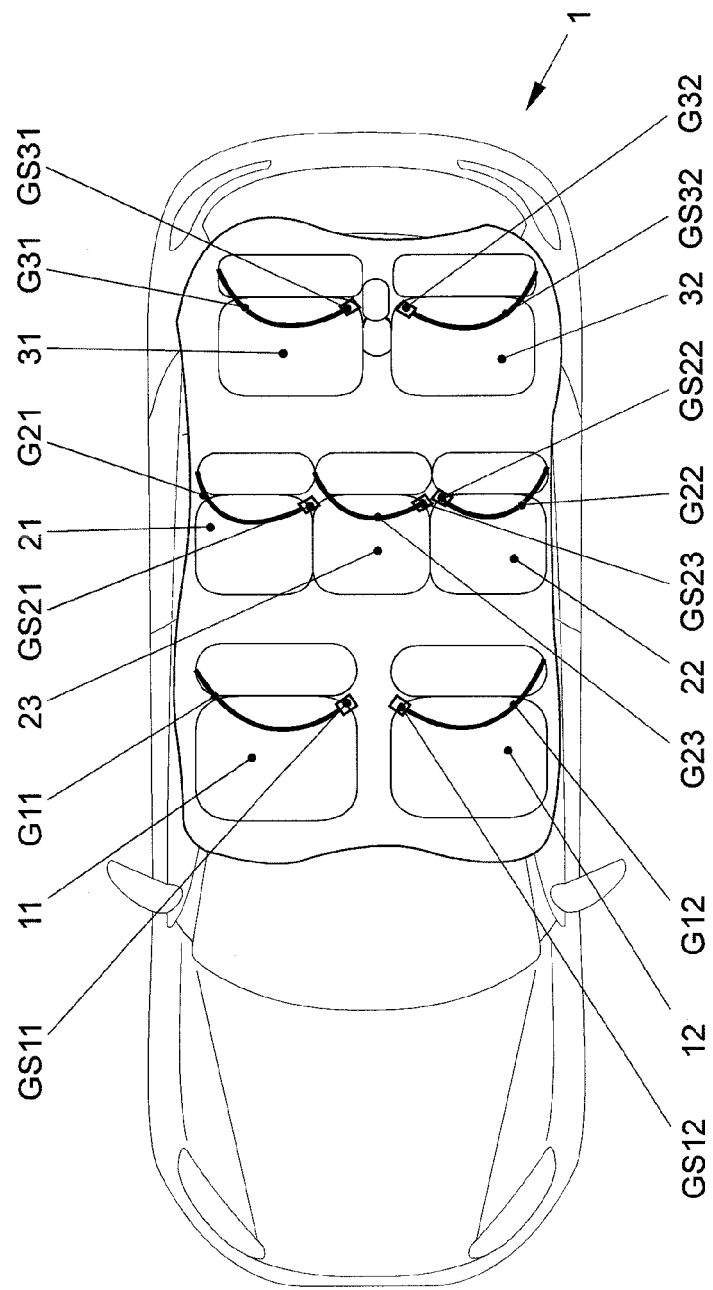
FIG. 3 shows the motor vehicle according to FIG. 1 in a basic sketch of a plan view.

FIG. 3 shows motor vehicle 1 in a basic sketch of a plan view. The motor vehicle includes a driver's seat 12, a front passenger seat 11, a second row of seats with three vehicle seats 21, 22, and 23, and a third row of seats with two vehicle seats 31 and 32. Driver's seat 12 is assigned a seat belt, designated with reference character G12, with a corresponding receptacle GS12, front passenger seat 11 is assigned a seat belt, designated with reference character G11, with a corresponding receptacle GS11, vehicle seat 21 is assigned a seat belt, designated with reference character G21, with a corresponding receptacle GS21, vehicle seat 22 is assigned a seat belt, designated with reference character G22, with a corresponding receptacle GS22, vehicle seat 23 is assigned a seat belt, designated with reference character G23, with a corresponding receptacle GS23, vehicle seat 31 is assigned a seat belt, designated with reference character G31, with a corresponding receptacle GS31, and vehicle seat 32 is assigned a seat belt, designated with reference character G32, with a corresponding receptacle GS32. Vehicle seats 21, 22, and 23 form a second row of seats and vehicle seats 31 and 32 form a third row of seats. Vehicle seats 21, 22, and 23 can be a seat bench.

Figure 4:
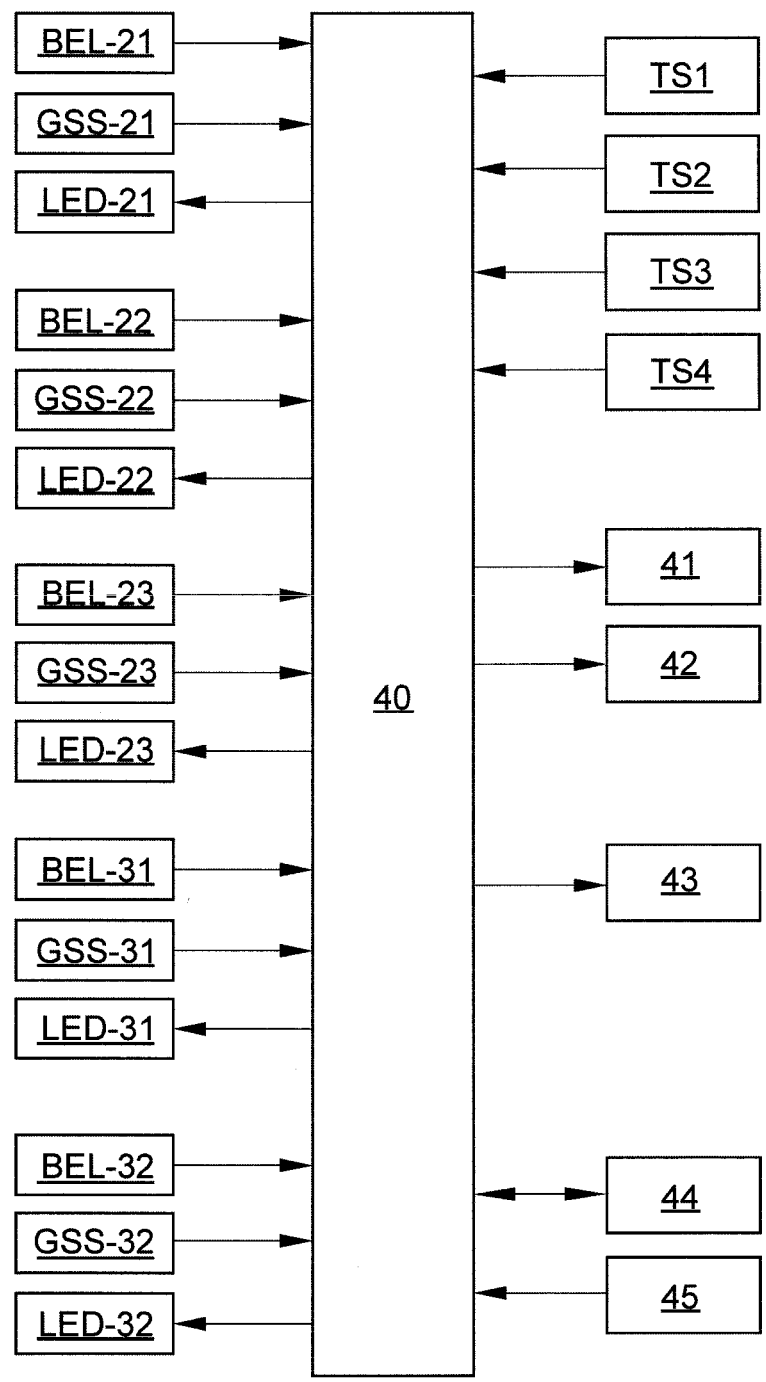
FIG. 4 shows an exemplary embodiment of a control unit for the motor vehicle according to FIG. 1 in a basic sketch.

The motor vehicle includes a control unit illustrated in FIG. 4 and designated with reference character 40. Input signals from control unit 40 are, inter alia, the output signal of a seat occupancy sensor BEL-21 for determining whether vehicle seat 21 is occupied, the output signal of a receptacle sensor GSS-21 for determining whether seat belt G21 is engaged in receptacle GS21, the output signal of a seat occupancy sensor BEL-22 for determining whether vehicle seat 22 is occupied, the output signal of a receptacle sensor GSS-22 for determining whether seat belt G22 is engaged in receptacle GS22, the output signal of a seat occupancy sensor BEL-23 for determining whether vehicle seat 23 is occupied, the output signal of a receptacle sensor GSS-23 for determining whether seat belt G23 is engaged in receptacle GS23, the output signal of a seat occupancy sensor BEL-31 for determining whether vehicle seat 31 is occupied, the output signal of a receptacle sensor GSS-31 for determining whether seat belt G31 is engaged in receptacle GS31, the output signal of a seat occupancy sensor BEL-32 for determining whether vehicle seat 32 is occupied, and the output signal of a receptacle sensor GSS-32 for determining whether seat belt G32 is engaged in receptacle GS32.

Additional input signals of control unit 40 are, inter alia, the output signal of a door sensor TS1 for determining the closing state of driver's door T1, the output signal of a door sensor TS2 for determining the closing state of the left back door T2, the output signal of a door sensor TS3 for determining the closing state of the front passenger door, and the output signal of a door sensor TS4 for determining the closing state of the right back door.

Figure 5:
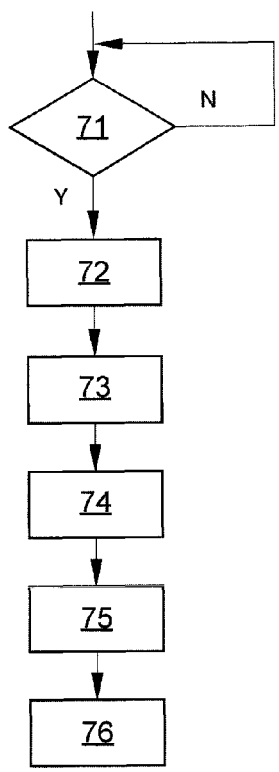
FIG. 5 shows a process implemented in the control unit according to FIG. 4.

FIG. 5 shows a process implemented in control unit 40, which begins with a query 71 whether a starting condition described hereafter has been met. A starting condition of this type can be met, for example, when the vehicle is started, the ignition key is turned, or all door sensors TS1, TS2, TS3, and TS4 indicate that the respective doors, such as doors T1 and T2, have been closed.

If the starting condition is met, then query 71 is followed by a step 72 in which it is determined by means of seat occupancy sensors BEL-21, BEL-22, BEL-23, BEL-31, and BEL-32 which vehicle seats 21, 22, 23, 31, or 32 are occupied.

Step 72 is followed by a step 73, in which a start command is generated by control unit 40 and output by an infotainment display 42 and/or by a speaker 41. A suitable start command can be, for example, the command "on your mark, get set, go"

or the command "ready, steady, go." A suitable start command can also be a countdown, for instance, "5, 4, 3, 2, 1 . . . buckle."

Step 73 is followed by a step 74, in which the times are determined that have passed after the outputting of the start command until in occupied vehicle seats 21, 22, 23, 31, or 32, the corresponding seat belts G21, G22, G23, G31, or G32 engage in the assigned receptacles GS21, GS22, GS23, GS31, or GS32.

Step 74 is followed by a step 75, in which an identification of the seat that corresponds to the shortest time is shown by display 42. In the exemplary embodiment shown in FIG. 2, vehicle seat 22 whose user has buckled up the fastest is marked with a star by display 42. It can also or alternatively be provided that the user of this vehicle seat 22 is indicated by name or another moniker or designator. To this end, it is provided optionally that control unit 40 detects the names of the persons occupying vehicle seats 21, 22, 23, 31, or 32. In another embodiment, a camera arrangement 45 can be provided by means of which an individual picture or video sequence of the individual users of vehicle seats 21, 22, 23, 31, or 32 is taken during the buckling up process. It can be provided that a picture or video sequence of the user who achieved the shortest time during the buckling up process is displayed or played or played-back on display 42.

In another embodiment of the invention, it can be provided that control unit 40 is assigned an Internet interface 44 by means of which in an optional step 76 an identification of the person who is assigned the shortest time or a corresponding picture or corresponding video sequence is put on the Internet.

As long as in an occupied vehicle seat 21, 22, 23, 31, or 32, seat belt G21, G22, G23, G31, or G32 is not engaged in corresponding receptacle GS21, GS22, GS23, GS31, or GS32, this is indicated on a display, designated with reference character 43 and disposed on the dashboard of motor vehicle 1. Alternatively, the driver can be directly alerted that the seat belt(s) are not engaged or other vehicle functions can be disabled.

Figure 6:
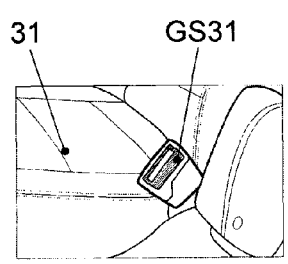
FIG. 6 shows an exemplary embodiment of a vehicle seat of the motor vehicle according to FIG. 1 before the outputting of a start command.
Figure 7:
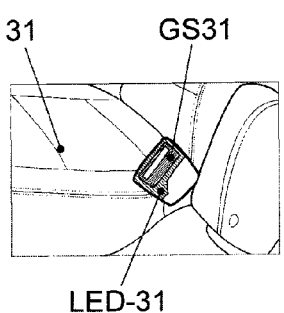
FIG. 7 shows the vehicle seat according to FIG. 6 during the outputting of the start command.
Figure 8:
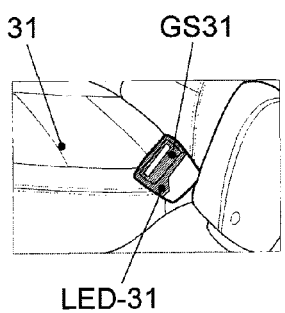
FIG. 8 shows the vehicle seat according to FIG. 6 after the outputting of the start command until the seat belt of the vehicle seat engages in the receptacle of the vehicle seat.

It can be provided that vehicle seats 21, 22, 23, 31, or 32 are assigned controllable lighting arrangements LED-21, LED-22, LED-23, LED-31, or LED-32 by control unit 40; the functions of such lighting arrangements are described in FIG. 6, FIG. 7, and FIG. 8 by way of example in regard to vehicle seat 31. In this case, FIG. 6 shows vehicle seat 31 before the outputting of the start command. During the outputting of the start command, receptacle GS31 has a green light, as shown in FIG. 7. After the outputting of the start command, receptacle GS31 blinks red, as shown in FIG. 8, until seat belt G31 engages in receptacle GS31.

It can be provided that front passenger seat 11 and driver's seat 12 are also configured analogous to vehicle seats 21, 22, 23, 31, or 32. Door sensor TS1, door sensor TS2, door sensor TS3, door sensor TS4, display 42, display 43, seat occupancy sensor BEL-21, receptacle sensor GSS-21, seat occupancy sensor BEL-22, receptacle sensor GSS-22, seat occupancy sensor BEL-23, receptacle sensor GSS-23, seat occupancy sensor BEL-31, receptacle sensor GSS-31, seat occupancy sensor BEL-32, and receptacle sensor GSS-32 are connectable via data links to control unit 40 via a bus, for example, a CAN (Controller Area Network) bus. It can also be provided that lighting arrangements LED-21, LED-22, LED-23, LED-31, or LED-32 are connected via data links via a CAN bus to control unit 40.

It can be provided in an optional embodiment that the start command is output only by lighting arrangements LED-21, LED-22, LED-23, LED-31, or LED-32, whereby in the simplest case the start command is output by the start of the blinking of a receptacle GS21, GS22, GS23, GS31, or GS32. In the previously described case, lighting arrangements LED-21, LED-22, LED-23, LED-31, or LED-32 are exemplary embodiments for a man-machine interface. In the configuration described above, speaker 41, display 42, and lighting arrangements LED-21, LED-22, LED-23, LED-31, or LED-32 are exemplary embodiments for a man-machine interface.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A motor vehicle comprising:
   a first vehicle seat;
   a first seat belt, assigned to the first vehicle seat and having an assigned first receptacle;
   at least one second vehicle seat;
   a second seat belt, assigned to the second vehicle seat and having an assigned second receptacle;
   a first receptacle sensor for determining whether the first seat belt is engaged in the first receptacle;
   a second receptacle sensor for determining whether the second seat belt is engaged in the second receptacle;
   a man-machine interface for outputting a start command instructing passengers to engage the first seat belt in the first receptacle and the second seat belt in the second receptacle; and
   a control unit for comparing a time from the outputting of the start command to the engaging of the first seat belt in the first receptacle to a time from the outputting of the start command to the engaging of the second seat belt in the second receptacle.

2. The motor vehicle according to claim 1, further comprising a lighting device for lighting the first receptacle during the time from the outputting of the start command to the engaging of the first seat belt in the first receptacle.

3. The motor vehicle according to claim 2, further comprising a lighting device for lighting the second receptacle during the time from the outputting of the start command to the engaging of the second seat belt in the second receptacle.

4. The motor vehicle according to claim 1, further comprising a lighting device for lighting the first receptacle during the time from the outputting of the start command to the engaging of the first seat belt in the first receptacle with a light of a first color.

5. The motor vehicle according to claim 4, further comprising a lighting device for lighting the first receptacle during the outputting of the start command with a light of a second color.

6. The motor vehicle according to claim 5, further comprising a lighting device for lighting the second receptacle during the outputting of the start command with a light of the second color.

7. The motor vehicle according to claim 4, wherein the first color is red.

8. The motor vehicle according to claim 4, further comprising a lighting device for lighting the second receptacle during the time from the outputting of the start command to the engaging of the second seat belt in the second receptacle with a light of the first color.

9. The motor vehicle according to claim 8, further comprising a lighting device for lighting the second receptacle during the outputting of the start command with a light of a second color.

10. The motor vehicle according to claim 1, wherein the start command comprises an acoustic or visual command presented to vehicle passengers.

11. The motor vehicle according to claim 1, wherein the start command comprises an acoustic or visual command presented to vehicle passengers through a vehicle infotainment system.

12. A motor vehicle comprising:
a first vehicle seat;
a first seat belt, assigned to the first vehicle seat and having an assigned first receptacle;
at least one second vehicle seat;
a second seat belt, assigned to the second vehicle seat and having an assigned second receptacle;
a first receptacle sensor for determining whether the first seat belt is engaged in the first receptacle;
a second receptacle sensor for determining whether the second seat belt is engaged in the second receptacle;
a man-machine interface for outputting a start command; and
a control unit for generating the start command and for determining a time from the outputting of the start command to the engaging of the first seat belt in the first receptacle and for determining a time from the outputting of the start command to the engaging of the second seat belt in the second receptacle,
wherein the control unit is configured to compare the time from the outputting of the start command to the engaging of the first seat belt in the first receptacle with the time from the outputting of the start command to the engaging of the second seat belt in the second receptacle.

13. The motor vehicle according to claim 12, wherein the control unit is configured to initiate an outputting of the shorter time.

14. The motor vehicle according to claim 12, wherein the control unit is configured to initiate an outputting of an identification of the vehicle seat corresponding to the shorter time.

15. The motor vehicle according to claim 12, wherein the control unit is configured to initiate the outputting of an identification of the person occupying the vehicle seat corresponding to the shorter time.

16. The motor vehicle according to claim 15, further comprising an Internet interface, assigned to the control unit, for posting on the Internet the person occupying the vehicle seat corresponding to the shorter time.

17. The motor vehicle according to claim 12, further comprising an Internet interface assigned to the control unit.

18. The motor vehicle according to claim 12, further comprising a camera for photographing a person occupying the first vehicle seat.

19. The motor vehicle according to claim 12, further comprising a camera for photographing a person, occupying the first vehicle seat, during the time from the outputting of the start command to the engaging of the first seat belt in the first receptacle.

20. The motor vehicle according to claim 12, further comprising a camera arrangement for photographing a person occupying the first vehicle seat and a person occupying the second vehicle seat.

21. The motor vehicle according to claim 12, further comprising a camera arrangement for photographing a person, occupying the first vehicle seat, during the time from the outputting of the start command to the engaging of the first seat belt in the first receptacle, and a person, occupying the second vehicle seat, during the time from the outputting of the start command to the engaging of the second seat belt in the second receptacle.

22. The motor vehicle according to claim 21, further comprising an Internet interface, assigned to the control unit, for posting on the Internet a photograph, taken by the camera arrangement, in regard to the person occupying the vehicle seat corresponding to the shorter time.

23. The motor vehicle according to claim 21, wherein the control unit is configured to initiate the outputting of a photograph, taken by the camera arrangement, in regard to the person occupying the vehicle seat corresponding to the shorter time.

24. A motor vehicle comprising:
a first seat belt having an assigned first receptacle;
a second seat belt having an assigned second receptacle;
an interface for outputting a start command instructing passengers to engage the first seat belt in the first receptacle and the second seat belt in the second receptacle; and
a control unit for comparing a time from the outputting of the start command to the engaging of the first seat belt in the first receptacle to a time from the outputting of the start command to the engaging of the second seat belt in the second receptacle.

* * * * *